April 14, 1931.   L. P. CHRISTMAN   1,800,434
RESILIENT ENGINE MOUNT
Filed Oct. 17, 1929

Inventor
Louis P. Christman
By Spencer Hardman & Fehr
His Attorneys

Patented Apr. 14, 1931

1,800,434

UNITED STATES PATENT OFFICE

LOUIS P. CHRISTMAN, OF DAYTON, OHIO, ASSIGNOR TO THE INLAND MANUFACTURING COMPANY, OF DAYTON, OHIO, A CORPORATION OF DELAWARE

RESILIENT ENGINE MOUNT

Application filed October 17, 1929. Serial No. 400,395.

This invention relates to a metal-isolating mounting unit adapted to be manufactured as a complete unit and readily assembled in place in the manner of an ordinary mounting bracket for mounting a member upon its support.

An object of the invention is to provide a very simple yet efficient resilient connector unit which can be economically manufactured and assembled upon the connected parts as a unit.

Another object is to provide such a unit having resilient rubber as the isolating material, which rubber is held under a permanent initial compression as manufactured and hence the compression on the rubber does not have to be adjusted at the time of assembling the connector upon the connected parts.

Further objects and advantages of the present invention will be apparent from the following description, reference being had to the accompanying drawings wherein a preferred embodiment of one form of the present invention is clearly shown.

In the drawings.

Similar reference characters refer to similar parts throughout the several views.

Figures 1, 2:
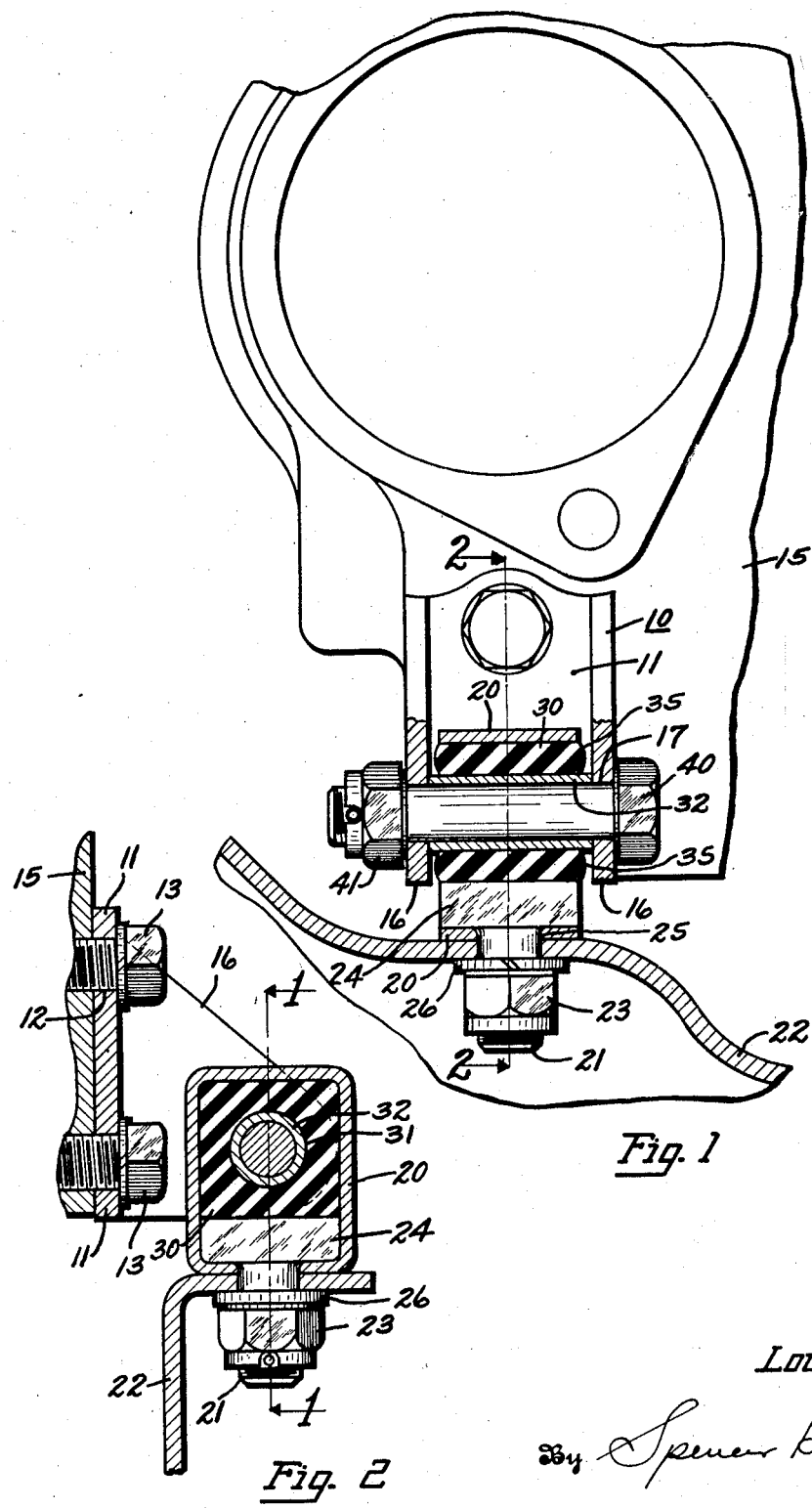
Fig. 1 shows the resilient mounting unit of this invention connecting a portion of an automobile engine upon its supporting chassis frame member. The unit is shown in vertical section on line 1—1 of Fig. 2.
Fig. 2 is a section on line 2—2 of Fig. 1.

Numeral 10 marks the pressed metal bracket which has its back wall 11 rigidly fixed to a vertical surface of a portion 15 of the engine by means of two bolts 13 extending through the two bolt holes 12 in wall 11. Bracket 10 has two parallel lateral ears 16 having aligned bolt holes 17 therein.

A metal casing 20 open at both ends and preferably of rectangular section, as shown, is rigidly fixed to the chassis frame member 22 by means of a projecting threaded shank 21 and a nut 23 threaded thereon. Preferably such shank is provided by a bolt having a special head 24 which fits snugly within the bottom of casing 20 and having its shank 21 projecting through hole 25 in casing 20, as clearly illustrated. The open-end casing 20 has a resilient rubber block 30 forced into and retained therein under a permanent initial high compression.

Rubber block 30 has a small central aperture 31 through which a metal sleeve 32 is forced, thus materially increasing the diameter of aperture 31 and hence displacing the rubber of block 30 and causing a further compression thereupon. This initial compression upon block 30 causes the rubber to bulge outwardly at the unconfined open ends of casing 20, as clearly illustrated at 35 in Fig. 1, and hence when the applied load falls upon the connector there will be only slight, if any, further outward bulging of the rubber at points 35. In making the assembly of parts 20, 24, 30 and 32, preferably the metal sleeve 32 is first inserted through the central aperture 31 in the rubber block 30 and then block 30 is forced by a suitably tapered funnel member into the casing 20, thereby putting the rubber under high initial compression and causing an axial flow and outward bulging of rubber at the points 35.

This assembly may then be rigidly fixed to the frame member 22 by the projecting bolt 21, lock washer 26 and nut 23. The bracket 10 may be separately fixed to the engine portion 15 by the two stud bolts 13. Now when the engine is set in place upon the chassis frame the casing 20 will be located between but spaced from the ears 16 of the bracket 10 and the sleeve 32 will be aligned with holes 17 in ears 16. The bolt 40 is then inserted and nut 41 screwed up tight to clamp sleeve 32 tightly between ears 16.

It will now be clear that the engine is isolated from the frame 22 by the resilient rubber block 30 but that the engine will be quite solidly supported by the resilient connectors, of which there are one or more on each side of the engine depending upon the type of engine support used. High frequency vibrations in all directions will be substantially damped out or prevented from being transmitted to the chassis frame, and hence a great amount of noise will be eliminated.

While the form of embodiment of the present invention as herein disclosed, constitutes a preferred form, it is to be understood that other forms might be adopted, all coming within the scope of the claim which follows.

What is claimed is as follows:

A metal-isolating vibration absorbing mounting unit comprising: an open-end rigid metal casing having attaching means projecting therefrom, said attaching means comprising a bolt having its head within and engaging an interior wall of said casing and having its shank projecting through an aperture in the casing, an elastic rubber block within said casing and held compressed thereby and having a central aperture therein, a metal sleeve within said aperture and having its ends projecting beyond said rubber block, a bracket member spaced from said casing and having opposed portions adjacent the opposed ends of said sleeve, and means extending through said sleeve for fixing said sleeve to said opposed portions.

In testimony whereof I hereto affix my signature.

LOUIS P. CHRISTMAN.